United States Patent

Wlodarczyk et al.

[11] Patent Number: 5,853,026
[45] Date of Patent: Dec. 29, 1998

[54] VALVE WITH DOWNSTREAM MANUAL BLEED

[75] Inventors: Anthony M. Wlodarczyk, Redlands; James T. Wright, III, Riverside; John L. Baker, Calimesa, all of Calif.

[73] Assignee: The Toro Company, Minneapolis, Minn.

[21] Appl. No.: 299,020

[22] Filed: Aug. 30, 1994

[51] Int. Cl.[6] .................................................. F16K 31/12
[52] U.S. Cl. ........................ 137/613; 251/30.05; 251/46; 251/215
[58] Field of Search .............................. 137/613, 624.12, 137/549; 251/30.05, 215, 46, 44

[56] References Cited

U.S. PATENT DOCUMENTS

| | | | |
|---|---|---|---|
| 3,282,552 | 11/1966 | Sommese, Sr. | 251/30.05 |
| 3,829,059 | 8/1974 | Rupert | 251/26 |
| 4,015,616 | 4/1977 | Hanff | 251/30.05 |
| 4,099,701 | 7/1978 | Berger | 251/30.05 |
| 4,301,992 | 11/1981 | Karbo | 251/46 |
| 4,336,918 | 6/1982 | Karbo | 251/46 |
| 4,505,450 | 3/1985 | Saarem et al. | 251/46 |
| 4,911,401 | 3/1990 | Holcomb et al. | 251/30.05 |

FOREIGN PATENT DOCUMENTS 194834  2/1908  Germany ................. 251/46

OTHER PUBLICATIONS

Rain Bird Brass and Plastic Valves Brochure, dated Jan. 1992.

*Primary Examiner*—A. Michael Chambers
*Attorney, Agent, or Firm*—James W. Miller

[57] ABSTRACT

A valve for controlling the flow of a liquid includes a valve seat which is engaged by a selectively operable valve member. A pressure chamber above the valve member contains upstream pressurized fluid in the closed position of the valve. The valve is opened by bleeding off pressurized fluid from this pressure chamber. A manual bleed screw assembly is used to manually open the valve when desired by initiating this pressure bleed procedure from the pressure chamber. The bleed screw assembly bleeds the pressurized fluid to a downstream location in the flow path, rather than to atmosphere, without having to completely remove the bleed screw assembly from the port in which it is received.

10 Claims, 2 Drawing Sheets

VALVE WITH DOWNSTREAM MANUAL BLEED

TECHNICAL FIELD

This invention relates to a valve which may be opened by bleeding off pressurized water from a pressure chamber above the valve diaphragm, and, more particularly, to such a valve having both a remotely controlled actuator and a manually controlled actuator for beginning the bleed process.

BACKGROUND OF THE INVENTION

Certain valves are well known for controlling the flow of water in an irrigation system. The Series 216 brass valves, which have long been manufactured and sold by The Toro Company, the assignee of this invention, are typical of the type of valve to which this invention is directed.

Toro Series 216 valves may be automatically actuated from a remote location or may be manually actuated at the valve itself. The automatic actuator typically comprises an electrically operated solenoid carried on the cap of the valve. When the solenoid is operated, fluid pressure contained in a pressure chamber above the valve diaphragm is bled through a solenoid bleed path contained in the valve body to the downstream side of the valve seat. The reduction in pressure above the diaphragm allows the water pressure at the fluid inlet on the upstream side of the valve seat to push the diaphragm up off the valve seat to open the valve. Typically, the solenoid is operated by an automated timing device to operate at particular times and particular intervals, to thereby control the operation of that portion of the irrigation system supplied by the valve.

The manual actuator carried on the Toro Series 216 valves comprises a bleed screw which is threaded into a bleed port in the top of the cap. The bleed screw closes off a bleed passage in the cap that extends between the pressure chamber above the valve diaphragm and the lower end of the bleed port. To manually open the valve, the bleed screw is unscrewed to remove it essentially completely from the bleed port and thus to open the bleed passage to atmosphere through the bleed port. Thus, the pressurized fluid in the pressure chamber above the valve diaphragm is substantially immediately vented to atmosphere, thus causing the valve to open in the same way as when the solenoid actuator is operated, i.e. the pressure beneath the diaphragm will lift the diaphragm up off the valve seat and fluid will then flow from the fluid inlet, up past the valve seat, and then back down and out through the fluid outlet.

The conventional manual bleed screw for operating valves like the Toro Series 216 valves has various disadvantages. For one thing, the screw is often completely removed from the cap to open the manual bleed passage to atmosphere and thus becomes disconnected from the cap when the valve is manually opened. If the user accidentally discards or otherwise misplaces the screw, the valve cannot be closed until a new bleed screw is procured and inserted back into the manual bleed port to close the bleed passage. If the user does not have such a replacement bleed screw handy, this necessitates a trip to get one. Obviously, the possibility of losing the bleed screw after it is removed from the valve and of having to keep replacement bleed screws on hand is a disadvantage of this design.

Moreover, these types of valves are often installed in valve boxes which become filled with water or debris over time. It is not uncommon for the valve to become submerged in the water standing in the valve box. Thus, the user has to reach down into this standing water, find and locate the bleed screw on the valve cap, and then turn the bleed screw multiple times to remove it from the bleed port to open the valve. This must often be done by feel only as the standing water in the valve box is usually dirty enough to prevent visual location of the bleed screw.

While the removal of the bleed screw is hard enough to do when opening the valve, the reinsertion of the bleed screw to close the valve is even more difficult. Again, if the cap of the valve is submerged in the standing water in the valve box, the user has to manually rethread the bleed screw into the bleed port solely by feel. In addition, this has to be done against the force of the pressurized fluid being vented from the pressure chamber through the bleed passage and bleed port, which force is in a direction which pushes the bleed screw away from the bleed port. Accordingly, it can be quite difficult to rethread the bleed screw into the bleed port to close the valve after it has been manually opened by removing the bleed screw from the bleed port.

Another problem with the conventional bleed screw design is the fact that it vents the pressurized fluid above the valve diaphragm directly to atmosphere in a rapid fashion. This causes the valve diaphragm to move to a fully open position establishing the maximum flow through the valve. Thus, even if the valve is equipped with a pressure regulator to control or regulate the pressure of the downstream fluid flow, this pressure regulation feature is lost when the manual bleed screw is used to manually open the valve.

SUMMARY OF THE INVENTION

It is one aspect of this invention to provide a valve which includes a manual bleed screw assembly that bleeds pressure to downstream to allow the valve to open, rather than to atmosphere.

This and other aspects of the invention are provided in a valve for controlling the flow of a liquid. The valve comprises an inlet, an outlet, a flow path for liquid flowing from the inlet to the outlet, and a valve seat located in the flow path between the inlet and the outlet. A selectively operable valve member is movably carried in the valve for sealing against the valve seat for closing water flow through the valve and which is movable away from the seat to allow water flow through the valve between the inlet and the outlet. One side of the valve member is exposed to fluid pressure upstream of the valve seat and the other side of the valve member forms a portion of a pressure chamber for receiving fluid pressure upstream of the valve seat such that the upstream fluid pressure is received on both sides of the valve member in a closed position of the valve. A manually operable bleed screw assembly is carried on the valve for selectively bleeding off fluid pressure from the pressure chamber in a manual bleed path provided in the valve which manual bleed path leads into the flow path downstream of the valve seat.

BRIEF DESCRIPTION OF THE DRAWINGS

This invention will be described more completely hereafter in the Detailed Description, when taken in conjunction with the following drawings, in which like reference numerals refer to like elements throughout.

DETAILED DESCRIPTION

Figure 2:
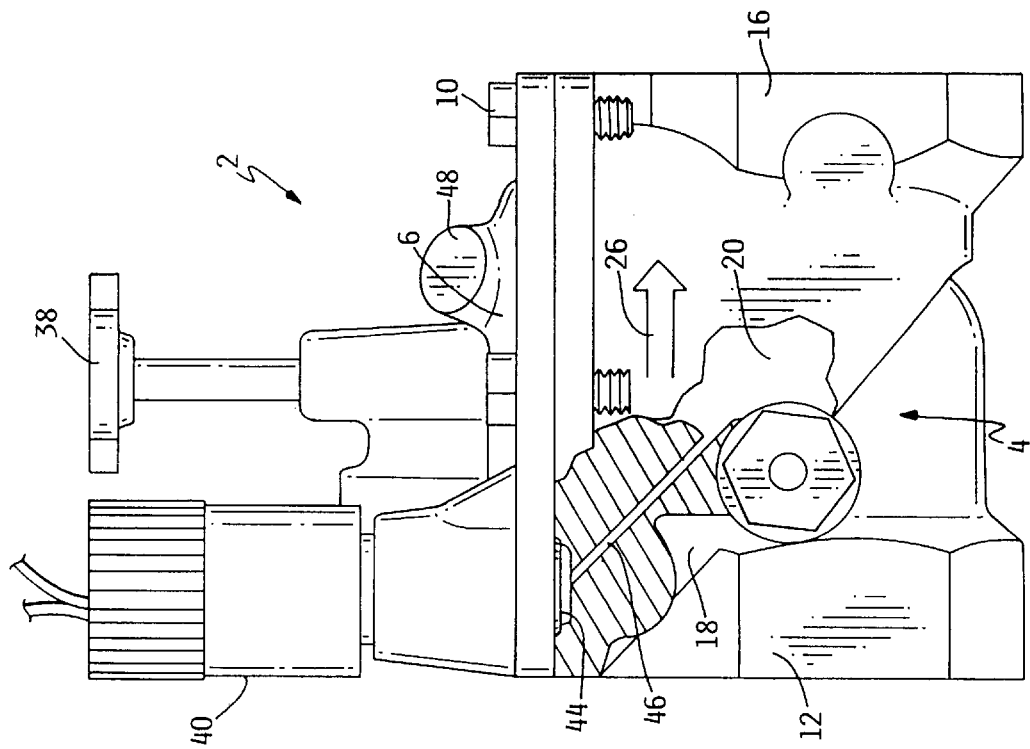
FIG. 2 is a side elevational view, partly in cross-section, of the valve shown in FIG. 1, particularly illustrating a second portion of the downstream bleed path for the bleed screw.
Figure 1:
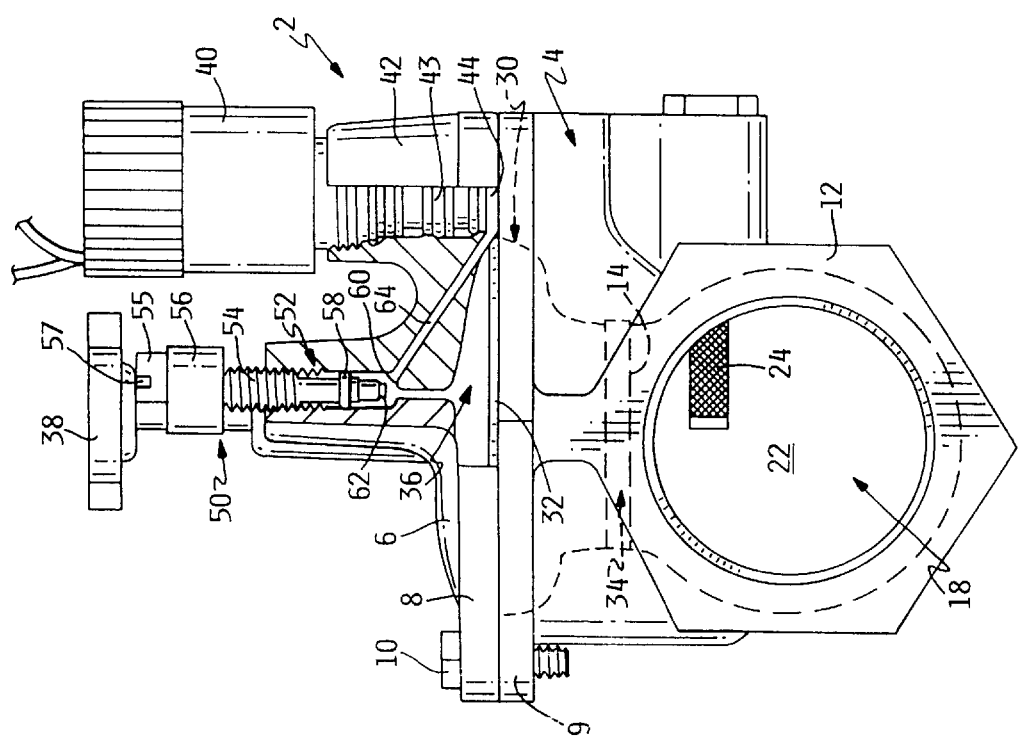
FIG. 1 is an end elevational view, partly in cross-section, of a first embodiment of a valve according to this invention, particularly illustrating the manual bleed screw for opening the valve and a first portion of the downstream bleed path for such bleed screw, all as seen from the inlet end of the valve.

Referring first to FIGS. 1 and 2, an improved valve according to a first embodiment of this invention is generally illustrated as 2. Valve 2 includes a valve housing which is formed by a valve body 4 which is closed at the top by a cap 6. Cap 6 and body 4 have mating flanges 8 and 9, respectively, and are held together by a plurality of attachment bolts 10 which extend down through flange 8 on cap 6 to be threaded into flange 9 on body 4. Valve body 4 and cap 6 are made of heavy brass to be durable and long lasting.

Valve body 4 has a fluid inlet 12 and a fluid outlet 16 arranged coaxially with fluid inlet 12. A concavely shaped inlet cavity 18 is located in valve body 4 upstream of a horizontal, circular valve seat 14 that forms the top of inlet cavity 18. A convexly shaped outlet cavity 20 is formed downstream of valve seat 14 in the remaining portion of valve body 4 to connect to fluid outlet 16. Outlet cavity 20 at least partially wraps around inlet cavity 18 and is formed by the annular space between the walls that define inlet cavity 18 and the exterior side walls of valve body 4.

FIG. 1 is an end elevational view looking into fluid inlet 12. The wall 22 forming the far end of inlet cavity 18 can be seen in FIG. 2 through fluid inlet 12. A filter or screen 24 can be arranged in valve body 4 extending into inlet cavity 18 to remove at least some of any particulate material suspended in the water passing through valve 2. When valve 2 is open, the water flow through valve 2 is through fluid inlet 12 and into inlet cavity 18, then up and over valve seat 14, and then downwardly into the surrounding outlet cavity 20, and then finally straight out through fluid outlet 16. The path of flow from fluid inlet 12 to fluid outlet 16 is visually indicated to the user by a flow arrow 26 molded or cast into the outside of one of the exterior side walls of valve body 4.

A resilient, diaphragm type valve member 30 is arranged above valve seat 14 and moves vertically into and out of engagement with valve seat 14. Valve member 30 includes an upper sealing bead or rim 32 that is captured in a groove formed between cap 6 and valve body 4 to seal valve member 30 in valve 2. Valve member 30 further includes a substantially horizontal, sealing face 34 that overlies and engages against valve seat 14 to seal against valve seat 14 and prevent flow through valve 2 when valve 2 is closed. Cap 6 has a slight dome shape such that a pressure chamber is formed above the diaphragm portion of valve member 30 as shown at 36 in FIG. 1.

Fluid pressure is normally constantly present in inlet cavity 18 beneath valve seat 14 pushing upwardly on valve member 30. Some of this pressurized fluid is constantly supplied through a small orifice or passage (not shown) to pressure chamber 36 located above valve member 30 to balance out or counteract the fluid pressure in inlet cavity 18 to keep valve 2 closed. Preferably, the area of the diaphragm portion of valve member 30 exposed to pressure in pressure chamber 36 is greater than the area of the diaphragm exposed to the same pressure in inlet cavity 18, which latter area is essentially the area of valve seat 14, so that a net downward force is developed on valve member 30 due to the fluid pressure on the opposed sides of the diaphragm portion thereof. In addition, a biasing spring (not shown) may be used between the top of valve member 30 and the underside of cap 6 to further assist in the closing of valve member 30 and ensure reliable operation thereof.

Valve 2 is opened by bleeding off the pressurized fluid contained in pressure chamber 36 above the diaphragm portion of valve member 30 through one or more bleed paths. As pressurized fluid is removed from pressure chamber 36, the force of the pressurized fluid in inlet cavity 18 will soon be strong enough to overcome the force of the biasing spring and raise valve member 30 up off valve seat 14. Water is then allowed to flow through valve 2 in the manner described earlier. The maximum opening of valve member 30 in the fully opened position can be manually controlled by vertically adjusting the uppermost or fully open position of valve member 30 using a manually controlled adjustment handle 38 provided on the top of cap 6.

Valve 2 is provided with two types of actuators for opening valve 2. The first is an electrically operated solenoid 40 that is contained on the top of cap 6 in a threaded port 42. A small internal tri-act valve, shown generally at 43, channels water both to and from pressure chamber 36 under the control of solenoid 40. Thus, solenoid 40 controls a first bleed path for bleeding fluid from pressure chamber 36 through tri-act valve 43. A first portion of this bleed path comprises a bleed passage (not shown) which extends from pressure chamber 36 into the lower non-threaded portion of port 42 in which the plunger of tri-act valve 43 is received.

Solenoid 40 is used to actuate tri-act valve 43 to both supply water to pressure chamber 36 and to remove water therefrom. Normally, in the closed position of valve 2, solenoid 40 will not be actuated and the spring loaded solenoid plunger (not shown) will exert pressure against the spring loaded tri-act plunger (not shown) to open an entry port in the tri-act plunger to allow water to flow from inlet cavity 18 up and into the tri-act plunger. From there, the water is allowed to flow through the tri-act plunger and into pressure chamber 36, using the same bleed passage (not shown) through which water will eventually be vented from pressure chamber 36. In this position of the tri-act plunger, a discharge port contained in the tri-act plunger will be blocked off.

When solenoid 40 is operated by sending 24 Volt AC power thereto when commanded by the irrigation controller or other automated timing device, the solenoid plunger moves up relative to bore 42, thus removing pressure from the tri-act plunger and also allowing the tri-act plunger to move up. The upward movement of the tri-act plunger closes off the entry port in the tri-act plunger, thus cutting off any additional water flow from inlet cavity 18 to pressure chamber 36, and simultaneously connects the discharge port in the tri-act plunger to the bleed passage leading to pressure chamber 36. Thus, with no additional fluid pressure being supplied to pressurized chamber 36, the pressurized fluid in pressure chamber 36 can now exit therefrom through the bleed passage and through the now open discharge port in the tri-act plunger.

The tri-act discharge port is arranged to allow fluid flow therethrough to exit downwardly into a small bleed chamber 44 located beneath tri-act valve 43. From there, bleed chamber 44 is connected to a further portion of the first bleed path, namely to the bleed passage 46 shown in FIG. 2. Bleed passage 46 is provided internally in valve body 4 and leads to outlet cavity 20 downstream of valve seat 14.

Thus, when solenoid 40 is operated, fluid pressure is bled from pressure chamber 36 through the first portion of the bleed path that leads to port 42 in which the plunger of tri-act valve 43 is received, then down through the tri-act plunger to bleed chamber 44 located beneath the tri-act valve 43, and then down through the second bleed passage 46 to outlet cavity 20 of valve 2. Accordingly, solenoid 40 effects a "downstream bleed" of pressurized fluid from pressure chamber 36 to a location downstream of valve seat 14 through internal passageways in valve cap 6 and valve body 4. The fluid so bled in this manner simply exits to downstream through fluid outlet 16, mixing with the water that flows through valve 2 after valve 2 opens.

The description of valve 2 offered to this point in this Detailed Description is accurate for at least some of the prior art Series 216 valves previously manufactured and sold by The Toro Company. Such Toro 216 valves, which are well known in the industry, have all of the above described components which function in the manner just described. The improvement to which this invention relates is directed to the final remaining major component of valve 2, namely to the manual bleed screw assembly 50 comprising the manual actuator for turning on valve 2 independently of the operation of solenoid 40 or any portion thereof, specifically independently of the operation of the plunger of solenoid 40 or of tri-act valve 43. In order to properly understand the significance of the bleed screw assembly improvements of this invention, the structure and operation of the bleed screw of the prior art Series 216 valves will be first described.

Toro Series 216 valves have typically had a manually operated bleed screw contained in a bleed screw port in cap 6 of valve 2 which port connects to pressure chamber. When the bleed screw was tightened into this port, it served to close off pressure chamber 36 and keep the pressurized fluid therein. To manually open valve 2, the bleed screw had to be manually screwed out of this port until it was basically completely removed therefrom. The pressurized fluid contained in pressure chamber 36 would then bleed directly to atmosphere by travelling straight up through the port and spraying out through the top of cap 6. Thus, the user often got wet opening the prior art manual bleed screw, and the water that was released from valve 2 through the bleed screw port would simply often fill up the valve box (not shown) in which valve 2 is typically installed, if water was not already present in this valve box. The traditional location of the prior art bleed screw in Toro Series 216 valves is shown at 48 in FIG. 2, the bleed screw having been moved in this invention to be closer to solenoid 40 in a domed portion of cap 6.

This invention comprises certain improvements to the manual bleed screw which avoids these and other problems that arise from the prior bleed screw design. Referring to FIG. 1, a bleed screw assembly 50 in the improved valve of this invention comprises a threaded shank 54 that is rotatably received in a port 52 in the top of cap 6. The upper end of shank 54 includes an enlarged head 56 to allow bleed screw assembly 50 to be gripped and turned by the user. This can be done using the fingers of the user, or by applying a wrench to a hex shaped portion 55 of head 56, or by applying the tip of a screwdriver to a screwdriver slot 57 in the top surface of head 56. The lower end of shank 54 is smooth and includes an O-ring 58 for sealing against the smooth sides of the lower portion of port 52. This prevents water from leaking past bleed screw assembly 50 and the walls of port 52 and out through the top of port 52.

In the valve 2 of this invention, bleed screw port 52 is provided with a small diameter, horizontal seat 60 against which the end of bleed screw assembly 50 may be abutted to seal off the manual bleed passage normally provided through port 52. To enhance the sealing effectiveness of bleed screw assembly 50, a small rubber sealing disk 62 is provided on the lowermost tip of bleed screw assembly 50 to seal against bleed screw valve seat 60, and valve seat 60 can be formed with an upwardly protruding sealing surface comprising a lip or annular ring (not shown) which is raised slightly above the remainder of valve seat 60 with such lip or ring shaped sealing surface engaging against sealing disk 62. In any event, when disk 62 is sealed against valve seat 60, bleed screw assembly 50 seals off pressure chamber 36 and prevents the exit of any pressurized fluid therefrom.

However, bleed screw assembly 50 can be axially moved in port 52 to lift the tip of bleed screw assembly 50 up off valve seat 60. This allows water to flow from pressure chamber 36 up to the gap created between valve seat 60 and the lowermost tip of bleed screw assembly 50. The water can also flow up around the outer diameter of bleed screw assembly 50, but is prevented from passing around bleed screw assembly 50 itself by O-ring seal 58.

An important part of this invention is the establishment of a second bleed path to the downstream side of valve seat 14 when the tip of bleed screw assembly 50 is lifted up off of bleed screw valve seat 60. In this invention, since bleed screw assembly 50 has been located on cap 6 generally close to the electrically operated solenoid 40, this is done by establishing the first portion of this second bleed path as a bleed passage 64 in cap 6 connecting bleed screw port 52 to bleed chamber 44 beneath the plunger of tri-act valve 43. From there, the second bleed path is completed by the already existing downstream bleed passage 46 that leads from bleed chamber 44 to outlet cavity 20. Thus, the second bleed path for the manual bleed screw assembly is formed in multiple portions, namely by a first portion comprising bleed passage 64 that is not provided in the prior art Toro Series 216 valves but which forms part of this invention and with the remaining portions comprising the bleed chamber 44 and downstream bleed channel 46 that already exist in the prior art Toro Series 216 valves.

The use of bleed chamber 44 and downstream bleed channel 46 is preferred for forming part of the downstream bleed path for the manual bleed screw assembly because only one relatively short and straight bleed passage 64 has to be additionally provided in cap 6, i.e. the passage leading from port 52 of bleed screw assembly 50 to bleed chamber 44 beneath the plunger of tri-act valve 43. However, this is not necessary for the present invention. A wholly independent bleed path leading to downstream, i.e. leading to some portion of outlet cavity 20, could have been provided in valve body 4 for bleed screw assembly 50 without using any portion of the bleed path already in place for solenoid 40. However, it is more economical and efficient to use at least part of the solenoid bleed path as described in connection with FIGS. 1 and 2.

Bleed path 64 leading from bleed screw port 52 is positioned to be only slightly above the level of bleed screw valve seat 60. This allows bleed screw assembly 50 to be opened, and thus to open valve 2, by requiring only a little turning of bleed screw assembly 50. Bleed screw assembly 50 does not have to be completely removed from port 52, as in the prior art design, but only has to be threaded out at most one turn or even a portion of one turn. This will raise sealing disk 62 off of valve seat 60 by a distance which is sufficient to allow pressurized fluid to flow up out of pressure chamber 36, and then out through bleed passage 64, bleed chamber 44, and solenoid downstream bleed passage 46.

Since bleed screw assembly 50 is never removed from valve cap 6 when opening valve 2, there is never any danger of losing it. In addition, there is no need to rethread bleed screw assembly 50 back down into port 52 when it is desired to close valve 2 as bleed screw assembly 50 is still in place in port 52. All the user has to do is to reach down and tighten bleed screw assembly 50 in port 52 until the tip of bleed screw assembly 50 reengages against bleed screw valve seat 60. This will allow pressurized fluid to build back up in pressure chamber 36 to reclose valve member 30 against valve seat 14.

Another advantage of the improved bleed screw assembly design of this invention is the fact that the bleed of pressurized fluid from pressure chamber 36 occurs to downstream and not to atmosphere. Thus, there is no release of fluid externally of valve 2, where it could for example fill the valve box (not shown) in which valve 2 is contained, but the fluid release is internal to valve body 4. Moreover, the execution of the bleed paths as shown in FIGS. 1 and 2 is particularly desirable, since a portion of the bleed screw assembly bleed path is formed by a portion of the already existing solenoid bleed path.

Figure 3:
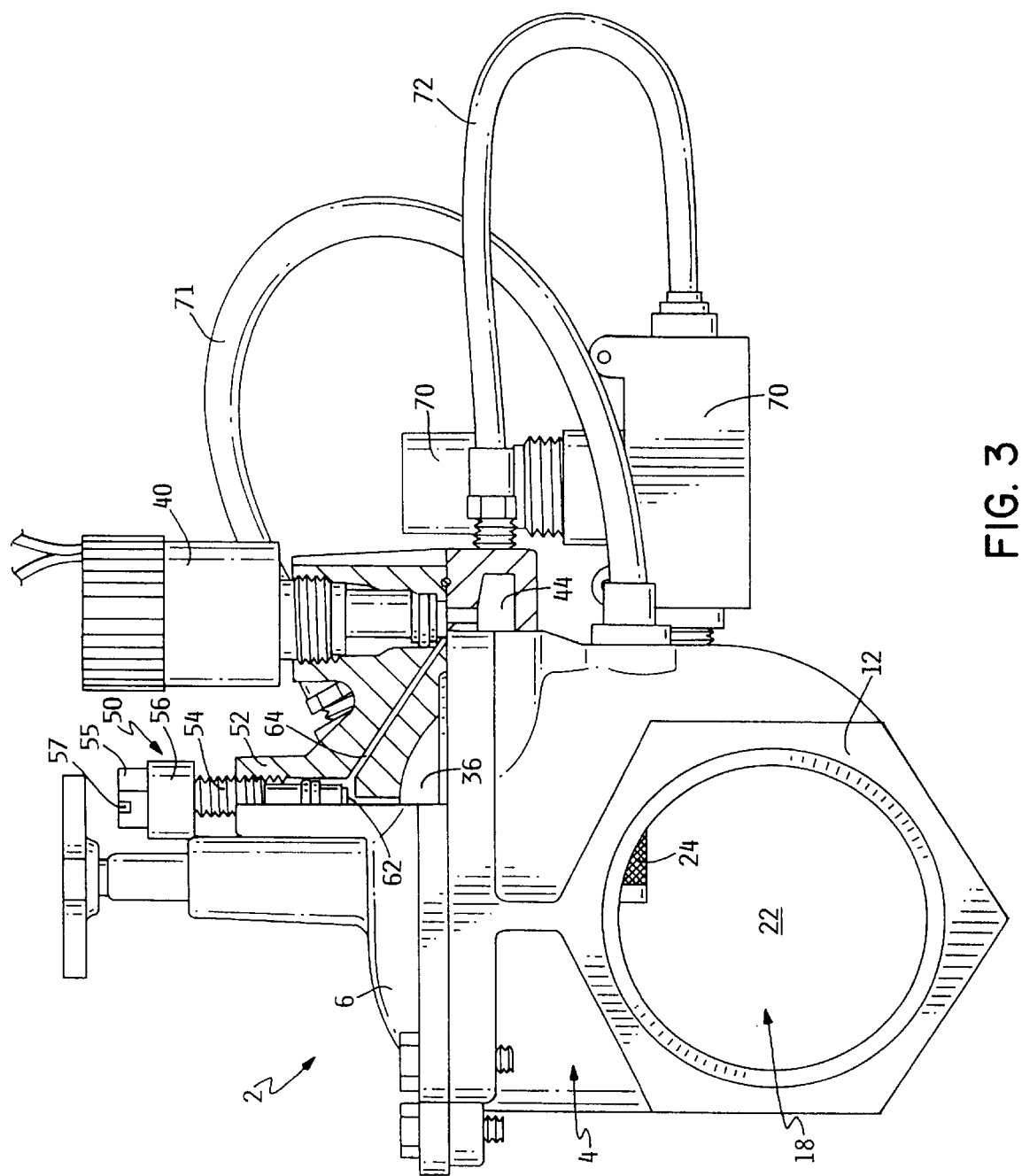
FIG. 3 is an end elevational view, partly in cross-section, of a second, pressure regulated embodiment of a valve according to this invention, particularly illustrating the manual bleed screw for opening the valve and the various portions of the downstream bleed path for such bleed screw, all as seen from the inlet end of the valve.

FIG. 3 illustrates a second embodiment of this invention showing use of the improved bleed screw assembly design of this invention in a valve 2 having a pressure regulator 70 for regulating the downstream or exit pressure of the fluid through fluid outlet 16 of valve 2. Such pressure regulated valves are already known in the Toro Series 216, and include any of a number of known pressure regulators suitably attached and connected to valve body 4.

In a pressure-regulated valve of this type, water is no longer supplied to pressure chamber 36 by passing it through a tri-act valve beneath solenoid 40, but is instead constantly supplied thereto by an external supply tube 71 leading from inlet cavity 18 to dump into pressure chamber 36. In addition, the downstream bleed passage 46 leading from solenoid bleed chamber 44 to downstream is no longer an internal passage in valve body 4. Instead, this downstream bleed passage is formed by an external bleed tube 72 leading from bleed chamber 44 beneath the plunger of solenoid 40 to the pressure regulator 70 itself. The plunger of the solenoid now directly controls a discharge port either closing it off or allowing it to open. Thus, when solenoid 40 is operated, the solenoid plunger will lift up off the discharge port, and fluid is bled from pressure chamber 36 first into solenoid port 42, then through the now opened discharge port, downwardly into bleed chamber 44, and then through bleed tube 72 and into pressure regulator 70 to reach downstream.

The execution of bleed screw assembly 50 of this invention in the pressure regulated valve 2 of FIG. 3 is much the same as in the first embodiment. Namely, a bleed passage 64 leads from the lower end of bleed screw port 52 to bleed chamber 44, which bleed chamber 44 is now located beneath the plunger of solenoid 40 rather than the tri-act plunger. Thus, when bleed screw assembly 50 is lifted up slightly in port 52 to disengage bleed screw valve seat 60, a complete downstream bleed path is still established, first through bleed passage 64, then through bleed chamber 44, external bleed tube 72 and pressure regulator 70. Thus, a in the first embodiment shown in FIGS. 1 and 2, the bleed screw assembly bleed path comprises a first portion that is newly added to valve body 4, namely bleed passage 64, and a second portion comprising the already existing portions of the solenoid bleed path that have been described above.

The addition of bleed screw assembly design of this invention, including the use of a downstream bleed path therefor, provides an additional, and important, advantage in a pressure regulated valve. Namely, the pressure regulation feature is not lost when valve 2 is manually opened using bleed screw assembly 50. Because not all the pressurized fluid in pressure chamber 36 is vented to atmosphere, the operation of bleed screw assembly 50 will not cause valve 2 to manually open to its fully open position, but will simply allow valve 2 to open to some position less than its fully open position. The exact opening position of valve 2 will be determined by the usual and normal operation of pressure regulator 70, i.e. valve 2 will open up to whatever position is required by the setting of the discharge rate through the downstream pressure regulator 70 to provided the desired pressure in the fluid passing through fluid outlet 16. This outlet pressure is kept constant regardless of fluctuations in inlet pressure to provide a regulated rate of flow.

Various modifications will be apparent to those skilled in the art. For example, while the improved bleed screw assembly 50 of this invention has been shown as part of a valve which also incorporates a remotely controlled actuator, i.e. solenoid 40, this is not strictly necessary. Bleed screw assembly 50 of this invention could be used even in a valve 2 of the type shown herein whether or not such valve included a solenoid or some other remotely controlled actuator. Thus, this invention is to be limited only by the scope of the appended claims.

We claim:

1. A valve for controlling the flow of a liquid, which comprises:

（a) a valve housing having an upper cap, the valve housing providing an inlet, an outlet, a flow path for liquid flowing from the inlet to the outlet, and a valve seat located in the flow path between the inlet and the outlet;

(b) a selectively operable valve member movably carried in the valve for sealing against the valve seat for closing water flow through the valve and which is movable away from the seat to allow water flow through the valve between the inlet and the outlet, one side of the valve member being exposed to fluid pressure upstream of the valve seat and the other side of the valve member forming a portion of a pressure chamber for receiving fluid pressure upstream of the valve seat such that the upstream fluid pressure is received on both sides of the valve member in a closed position of the valve; and (c) an upwardly facing manually operable bleed screw assembly carried on the cap of the valve for selectively bleeding off fluid pressure from the pressure chamber to open the valve independently of the operation of any other on/off control device, wherein the bleed screw assembly controls flow in a manual bleed path provided in the valve which manual bleed path leads into the flow path downstream of the valve seat, and wherein the bleed screw assembly is rotatable carried, on the cap of the valve for rotation about a substantially vertical axis.

2. A valve as recited in claim 1, wherein the bleed screw assembly is threaded into a port carried on the valve and is axially movable relative to the port as the bleed screw assembly is turned, and wherein the bleed screw assembly includes means for effecting the downstream bleed of the fluid pressure from the pressure chamber without removing the bleed screw assembly from the port, whereby the bleed screw assembly never has to be removed from the port when opening or closing the valve.

3. A valve as recited in claim 2, wherein the downstream bleed effecting means is operable within at most one complete 360° turn of the bleed screw assembly from a fully closed position of the bleed screw assembly in the port, whereby only a small amount of turning of the bleed screw assembly in one direction is required to open the valve and only a small amount of turning of the bleed screw assembly in an opposite direction is required to close the valve.

4. A valve as recited in claim 3, wherein the downstream bleed effecting means is operable within only a portion of one complete 360° turn of the bleed screw assembly from a fully closed position of the bleed screw assembly in the port.

5. A valve as recited in claim 1, further including a solenoid carried on the valve for further selectively bleeding off fluid pressure from the pressure chamber in a solenoid bleed path provided in the valve which solenoid bleed path also leads into the flow path downstream of the valve seat, wherein the valve may be opened either by actuating the solenoid or by operating the manual bleed screw assembly.

6. A valve as recited in claim 5, wherein a portion of the manual bleed path and a portion of the solenoid bleed path are the same.

7. A valve as recited in claim 1, further including a pressure regulator located in the flow path downstream of the valve seat to regulate the pressure of the liquid flowing through the outlet, whereby the operation of the manual bleed screw assembly and the downstream bleed of fluid pressure from the pressure chamber does not interfere with the pressure regulation afforded by the pressure regulator.

8. A valve for controlling the flow of a liquid, which comprises:

(a) a valve housing which comprises a valve body having an upper end closed by a cap, the valve housing providing an inlet, an outlet, a flow path for liquid flowing from the inlet to the outlet, and a valve seat located in the flow path between the inlet and the outlet;

(b) a selectively operable valve member movably carried in the valve for sealing against the valve seat for closing water flow through the valve and which is movable away from the seat to allow water flow through the valve between the inlet and the outlet, one side of the valve member being exposed to fluid pressure upstream of the valve seat and the other side of the valve member forming a portion of a pressure chamber for receiving fluid pressure upstream of the valve seat such that the upstream fluid pressure is received on both sides of the valve member in a closed position of the valve;

(c) a remotely controlled actuator comprising an electrically operated solenoid carried on the cap of the valve in a first, upwardly facing Port for selectively bleeding off fluid pressure from the pressure chamber in a first bleed path provided in the valve which first bleed path leads into the flow path downstream of the valve seat; and (d) a manually operable actuator comprising an upwardly facing, rotatable bleed screw carried on the cap of the valve in a second, upwardly facing port which is separate from the first port, wherein the bleed screw is rotatable on the cap within the second port about a substantially vertical axis for selectively bleeding off fluid pressure from the pressure chamber in a second bleed path provided in the valve which second bleed path leads into the flow path downstream of the valve seat, wherein the operation of the manually operable actuator is independent of the operation of the remotely controlled actuator to allow either actuator to independently open the valve without moving the other actuator.

9. A valve as recited in claim 8, wherein a portion of the first bleed path and a portion of the second bleed path are the same.

10. A valve as recited in claim 8, wherein a first portion of the second bleed path comprises a bleed passage formed in the cap connecting the second port in which the bleed screw is carried to the first port in which the solenoid is carried with the bleed passage connecting to the first port at a bleed chamber located beneath a plunger of the solenoid, the bleed chamber being continuously connected to the flow path downstream of the valve seat.

* * * * *

UNITED STATES PATENT AND TRADEMARK OFFICE
CERTIFICATE OF CORRECTION

PATENT NO. : 5,853,026
DATED : December 29, 1998
INVENTOR(S) : Anthony M. Wlodarczyk et al.

It is certified that error appears in the above-indentified patent and that said Letters Patent is hereby corrected as shown below:

In claim 1, "rotatable carried," should read --rotatably carried-- at Column 8, line 52.

In claim 8, "Port" should read --port-- at Column 10, Line 7.

Signed and Sealed this

Sixth Day of April, 1999

Attest:

Attesting Officer

Q. TODD DICKINSON

Acting Commissioner of Patents and Trademarks